United States Patent [19]
N'Guyen Van

[11] 3,839,662
[45] Oct. 1, 1974

[54] MOTORIZED VALVE CONTROL
[75] Inventor: Trong N'Guyen Van, La Celle St. Cloud, France
[73] Assignee: La Telemecanique Electriques, Nanterre, France
[22] Filed: May 8, 1973
[21] Appl. No.: 358,277

[52] U.S. Cl.............. 318/160, 318/475, 318/685, 251/134, 251/136
[51] Int. Cl....................... F16k 31/10, H02k 23/68
[58] Field of Search .......... 318/159, 160, 166, 475, 318/685; 251/133, 134, 136

[56] References Cited
UNITED STATES PATENTS
3,488,030  1/1970  Hulme ............................ 251/134

Primary Examiner—Robert K. Schaefer
Assistant Examiner—Thomas Langer
Attorney, Agent, or Firm—William Anthony Drucker

[57] ABSTRACT

A device for locking a motor driven valve or cock to hold it in an open or closed position selectively. A variable reluctance step by step motor is coupled to the valve through a resilient element and is speed controlled from a sensing unit which applies a holding current to the motor. A coincidence sensor is fed pulses from two position sensors responsive to magnetic changes 7 Claims, 3 Drawing Figures

MOTORIZED VALVE CONTROL

The invention relates to a locking device for valve or motorized cocks, including a motor, an element sensing the open/close condition and a circuit controlling the motor speed. Such devices are frequently used in valves or cocks designed for interrupting or allowing the flow of fluids, from a control panel remote from the line to be controlled.

We already know systems of this kind in which the motor is a DC motor or AC motor which can be stopped by activating by limit contacts.

Those systems present a number of drawbacks resulting on the one hand from the nature of the motor, and on the other hand from the uncertainty of the quality of the lock achieved by the only use of limit contacts.

Indeed, DC motors do not always have the desired coupling characteristics for an action of this kind. AC motors also show restrictive characteristics resulting from their constant speed. When the stop orders reach such motors, which are generally linked with speed reducers, we are always faced with an excess of energy that must be dispelled through thrust bearings or friction couplings.

Finally, all those motors do not present a setting static coupling enabling them to occupy a given position in a stable manner.

It was also proposed to use brake motors or coding devices integral with the driven element, but such solutions are complex and costly.

Finally, the use of limit contacts does not ensure by itself that we are certain that the valve or the cock will be closed with the required tightness, namely with a given compression of the sealing elements, particularly in the case of the wear of mobile parts.

The invention proposes to supply a locking device which does not present the drawbacks common to the previous devices and systems, and aims at providing a setting static coupling, using a motion transmission system which does not necessarily require mechanical speed reducers, to investigate the potential of velocity modulation offered by certain kinds of motors, and to guaranty a clearly defined tightness effort in order to ensure the quality of the tightness.

According to the invention, this result is achieved thanks to the fact that the motor is a step by step motor with variable reluctance, linked with the sealing unit by at least one resilient element, and is controlled by a circuit monitored by a sensor unit responsive to the deformation of said resilient element, a holding current being applied to the motor when the resilient element is subjected to a given stress. According to a particularly interesting execution of the invention, the sensor unit includes a surge sensor fed by pulses generated by two position sensors respectively influenced by two marking supports, linked to two points distincts from the resilient element.

The invention will be best understood with the help of the description and the figures illustrating it in the following manner and in which.

Figure 1:
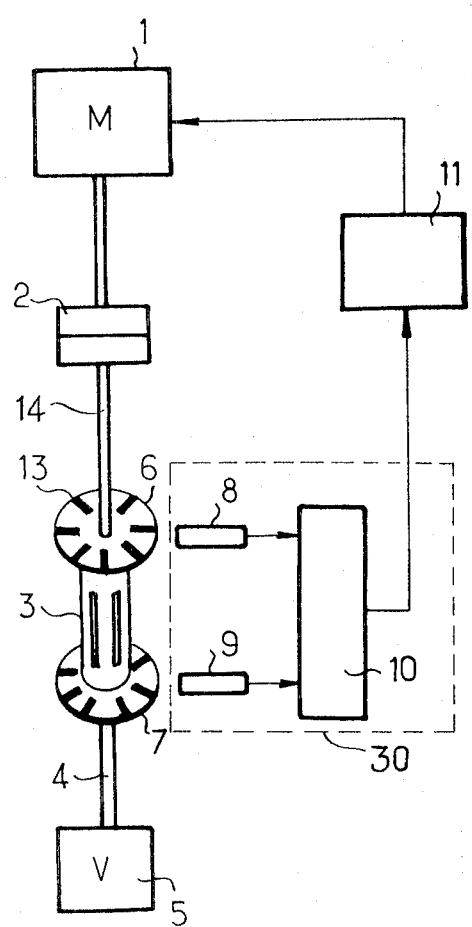
FIG. 1 shows a locking device according to the invention, in the case of a rotary valve.

In the example illustrated in FIG. 1, we presented a rotating motor with variable reluctance 1.

This motor is supplied by a control circuit 11, including a pulse generator 1 which recurrence frequency is selected in function of a number of elementary steps of the motor and the desired closing speed. We know that such motors have a high coupling at slow rotation speeds and a static holding coupling which enables one to stop them in a given position thanks to the circulation of a spacing current which is only a fraction of the nominal current. This interesting characteristic is used to avoid having to use an irreversible transmission system.

The shaft of the motor can communicate its movement through a reducer 2 if this is necessary. In most utilization cases, it is possible to do without a reducer by selecting a fairly low pulse frequency which is translated by a high coupling. Then the rotation movement is transmitted to the sealing unit 4 through a resilient element 3 which is composed in such a way that it can withstand an important angular deformation when its extremity linked to the sealing unit is immobilized by the tightness of the disc valve or the barrel-throttle of the valve on its seat, and that the motor is still giving a coupling.

The deformation to which the resilient element is subjected is used by mean of two discs respectively numbered 6 and 7 which are linked to its extremities and each bearing markings, notches or structural indequalities 13, which react without contact on two position sensors, respectively numbered 8 and 9, placed near them and forming a part of a sensing and monitoring unit 30 comprising, in this example, a coincidence circuit 10.

When the valve is in the process of being closed, the friction characteristics are translated on the sealing unit 4 by an operating couple so unimportant that the resilient element is not subjected to a twisting deformation.

The markings 13 are positioned and staggered in such a way that in this case the signals generated by the sensors 8 and 9 are not synchronous.

When the resisting coupling given by the sealing unit increases, the shape of the resilient element is altered and the markings made on the discs 6 and 7 are not staggered in the same way, and consequently the pulses produced by the detectors are timed closer. When those very pulses are synchronous, namely when a coupling of a given value is applied on the sealing unit, the coincidence circuit 10 which is fed by the signals from the detectors, produces an exit signal blocking the pulse generator of the control circuit 11, and then in turn stops the motor.

If the motor was a regular type of motor, the energy stacked up in the resilient element 3 would be returned to the motor and would have a tendency to make it turn backward. This harmful effect, which would not be translated by an unlocking of the sealing unit, is prevented by the fact that a residual current is supplied for holding to the variable reluctance motor and therefore this motor cannot turn in either way.

Consequently we achieved a calibrated tightness and the holding into position of the sealing unit.

The adjustment of the effort to be applied can be obtained by staggering at rest the two discs 6 and 7, or by moving at least one of the position sensors 8 and 9.

Although on the example presented above the discs 6 and 7 are supported by the extremities of the resilient element, this presentation is by no mean restrictive. Any execution in which the discs are subjected to a relative shift, evidently falls into the framework of the invention; in this manner the discs could be set at two places located between the extremities.

Figure 3:
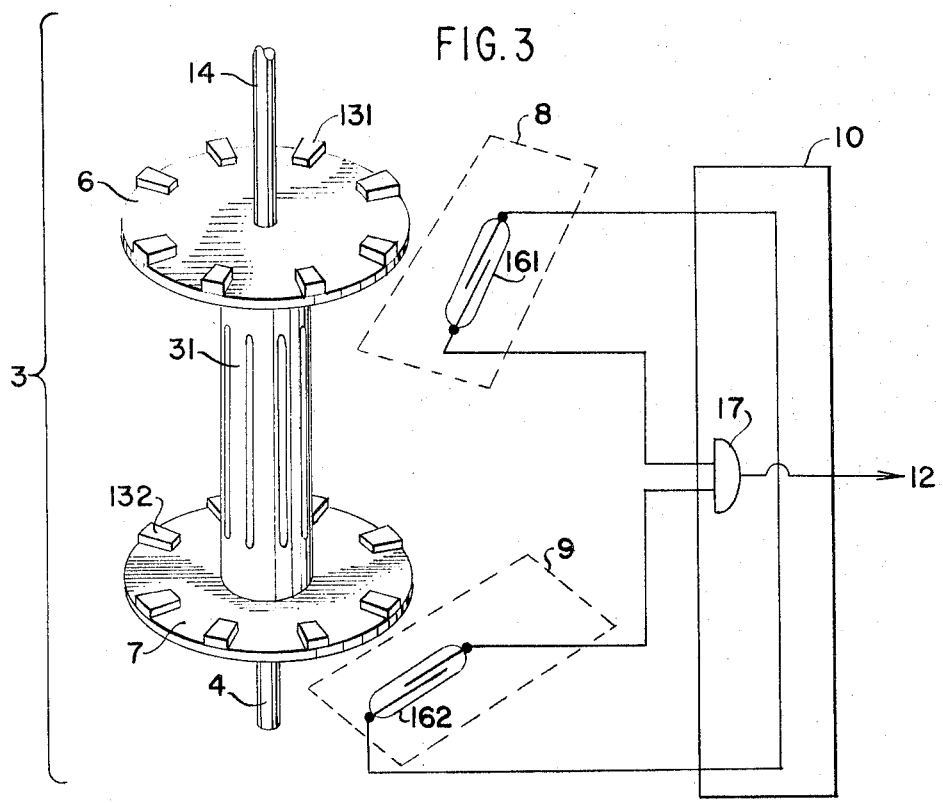
FIG. 3 shows a preferred embodiment of elements of the device shown in FIG. 1.

The whole of the sensors 8, 9 and the coincidence circuit 10 could be simply executed by using a single sensor simultaneously influenced by the markings of both discs; this is the manner in which we could propose to equip the discs with magnetic or magnetizable masses which respective position, for a given arming of the resilient element, would produce a magnetic field which intensity or shape would cause the close or the opening of a flexible plate switch or reed-relay. We could also design a sensor device in which a light ray would be freed or interrupted to activate a photosensitive cell. The resilient element can itself include cylindrical or tubular elements, eventually locally weakened as shown in FIG. 3 or coil springs.

It is evident that the illustrated example is not limited either to the case when the movements are angular. The variable reluctance motor can be a linear driver linked to a compression or traction resilient element linked to two marking supports. An interesting execution is the one in which the sensors check the coils of a coil spring until the time when compression (or the traction) brings the coils to a spacing corresponding to the distance between the sensors.

Figure 2:
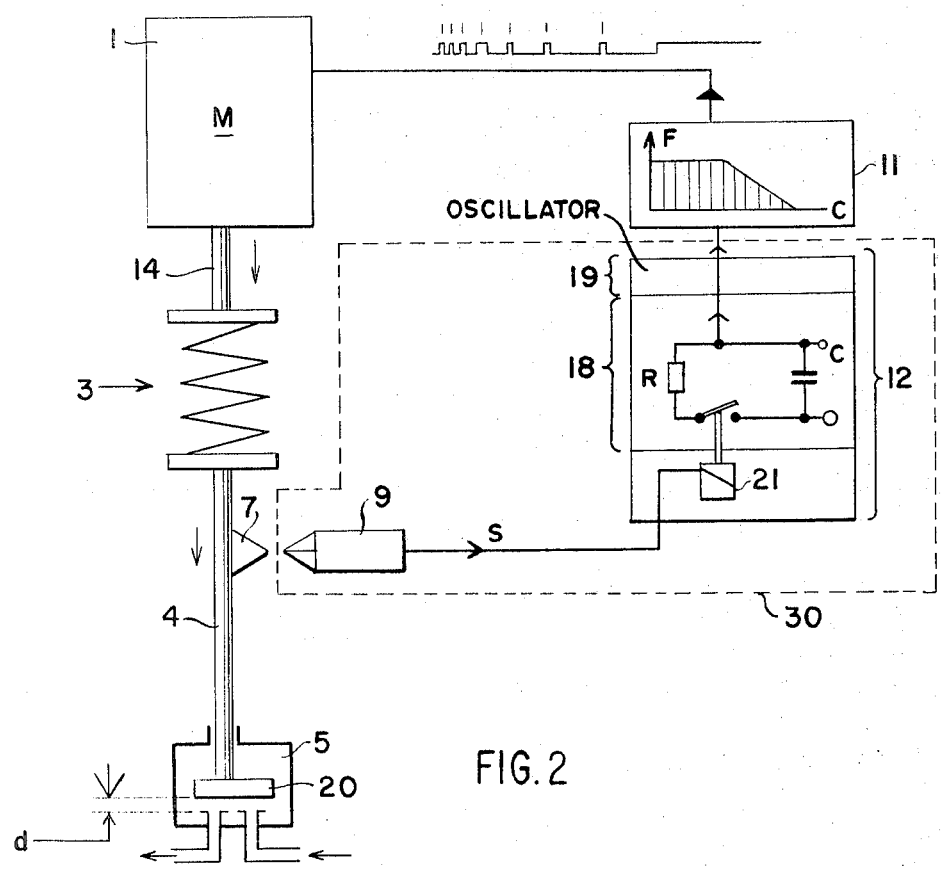
FIG. 2 shows a locking device according to the invention, in the case of a sliding-clack valve.

In the example illustrated in FIG. 2, we achieve an arming of the resilient element 3 by having the variable reluctance motor run a given length.

The example studied here was the result of an execution in which the motor is of the linear type. The resilient element 3 may be a coil spring, a stack of dished washers or any other kind of element offering the desired characteristics.

Between the lower extremity of the resilient element and the clock 20 of the valve 5, we placed on the sealing unit a gate 7 which will cause the appearing of a signal at the exit of the position sensor 9, when both apparatus are facing each other. The assembling of the device is carried out in such a manner that when gate 7 is accurately facing sensor 9, a small-precalibrated distance d is comprised between the lower face of clack 5 and the clack-seating of valve 20. This facing gives rise to an output signal S from sensor 9. The generated signal in turn reacts on a slowing and arming circuit 12 which modulates the pulse generator of control circuit 11 so that the frequency of the generator 11 progressively diminish until we obtain a voltage scale that would result in the application of the holding current. Circuit 12 may comprise, as shown, a relay 21 actuated by signal S, a resistor capacitor circuit 18 and an oscillator 19, the frequency of which varies in accordance to the value of the control voltage applied thereto. When actuated, the relay 21 causes capacitor C (the d.c fed circuit of which is not shown) to discharge into resistor R during a given duration, thereby lowering the voltage of the upper armature of capacitor C, coupled to the control input of oscillator 19. The pulse generator of the motor control circuit, being driven by the oscillations of oscillator 19, the frequency of the pulses fed to the motor 11 become lower, that is the duration of the pulses become still larger until it becomes a continuous holding voltage.

In this system the arming of the resilient element is therefore caused and held by a displacement of a given number of pitches, in accordance with the time when the position sensor signals that the sealing unit has reached a given point corresponding with the closing stage. An accurate adjusting of the discharge time of the capacitor C induces a well-determined number of pulses supplied by control circuit 11 between the instant when gate 7 reaches the facing of sensor 9 and the instant the holding current is applied, as well as a well-defined frequency decrease characteristic of these pulses. The number of pitches the motor advances, after the relay 21 has been triggered is thus well defined, and so is the relative displacement of stems 14 and 4, and therefore, the compressive sealing strength. Turning back to the embodiment shown in FIG. 1, the resilient element 3 is a cylindrical resilient portion which can be angularly deformed when a differential torque is applied to its extremities, which is achieved when the stem 4 of the valve is submitted to a braking or stopping action. The extremities of element 3 are equipped with respective discs 6 and 7, made of a non magnetic matter, and carrying regularly spaced magnetic marks (131 and 132), for instance permanent magnets. In this case, sensing means 8 and 9 are, for example, reed-relays 161 and 162, which are responsive to the magnetic fields of marks 131 and 132. One electrode of each relay is coupled to an AND gate 17, which forms a part of unit 30. The output signal of gate 17 monitors the control circuit 11 by means of a circuit such as 12 of FIG. 2, for instance.

It is evident that the quoted example is not restrictive and that we could in a similar manner use a rotating variable reluctance motor combined with an angular position sensor.

I claim:

1. Locking device for a valve or a motorized cock having a sealing unit, said device being of the type including a motor, a sensing and monitoring unit and a control circuit means for the motor, said control circuit means monitoring said sensing and monitoring unit and having a control input, wherein said motor is a step by step motor with variable reluctance, linked to the sealing unit by at least one resilient element having two extremities respectively coupled to the motor and to the sealing unit, said resilient element becoming deformed when said extremities are displaced with different velocities, wherein said sensing unit is responsive to the deformation of said element, and wherein the control circuit means supplies the motor selectively with recurrent pulses and with a holding current according to whether the resilient element is subjected or not to a given stress, corresponding to a given deformation detected by said stress, the holding current being applied when it is subjected to said stress, said stress inducing a given clamping torque or strength of the valve according whether it is a rotary or a sliding-clack valve.

2. Device in accordance with the claim 1 wherein said monitoring and sensing unit comprises a coincidence sensor fed by pulses generated by two position sensors respectively influenced by two marking supports linked in two distant points of the resilient element.

3. Device in accordance with the claim 1 wherein said monitoring and sensing unit comprises position sensors which are made of a flexible plate switch influenced by the shape or the intensity of a magnetic field produced by magnetic masses born by each marking support and a coincidence circuit coupled to said switches.

4. Device in accordance with the claim 1, wherein said sensing and monitoring unit comprises one position sensor which reacts to a given position of the sealing unit and frequency modulating means controlled by said sensor.

5. Device in accordance with claim 1, wherein said monitoring and sensing unit comprises at least one position sensor and frequency modulating means controlled by said sensor and wherein said resilient element carries at least one mark influencing said sensor.

6. A device according to claim 1, wherein the valve being of the rotary type, the resilient element is of cylindrical shape, and wherein said sensing and monitoring unit is sensitive to marks positioned on said element on the opposite extremities thereof.

7. A device according to claim 1, wherein the valve being of the sliding-clack type, the resilient element is a coil spring, and wherein said sensing and monitoring unit is sensitive to at least one mark positioned on said sealing unit.

* * * * *